(12) United States Patent
Warren et al.

(10) Patent No.: US 6,772,042 B1
(45) Date of Patent: Aug. 3, 2004

(54) PROGRAMMABLE COOLANT NOZZLE SYSTEM

(75) Inventors: Marc R. Warren, Colchester, CT (US); Stephen R. Gardner, Vernon, CT (US)

(73) Assignee: Dimensional Control, Inc., South Windsor, CT (US)

( * ) Notice: Subject to any disclaimer, the term of this patent is extended or adjusted under 35 U.S.C. 154(b) by 207 days.

(21) Appl. No.: 10/144,181

(22) Filed: May 13, 2002

Related U.S. Application Data (60) Provisional application No. 60/290,735, filed on May 14, 2001.

(51) Int. Cl.[7] .............................. B23B 51/06; B23C 5/28
(52) U.S. Cl. .......................... 700/177; 408/61; 409/135
(58) Field of Search ................................ 700/175–178; 184/104.1–104.3; 451/449; 408/4, 8–13, 56–61; 409/135, 136

(56) References Cited

U.S. PATENT DOCUMENTS

| | | | |
|---|---|---|---|
| 4,636,938 A | | 1/1987 | Broome ...................... 364/191 |
| 5,084,660 A | | 1/1992 | Sasaki et al. .......... 364/474.23 |
| 5,378,091 A | * | 1/1995 | Nakamura .................. 409/132 |
| 5,419,661 A | * | 5/1995 | Meachum ..................... 408/57 |
| 5,444,634 A | | 8/1995 | Goldman et al. ....... 364/474.11 |
| 5,595,462 A | * | 1/1997 | Hensley ...................... 409/132 |
| 6,161,055 A | * | 12/2000 | Pryor ......................... 700/175 |
| 6,299,388 B1 | * | 10/2001 | Slabe .......................... 407/11 |
| 6,302,004 B1 | * | 10/2001 | Taylor ......................... 82/1.11 |
| 6,382,887 B1 | * | 5/2002 | Nakai ......................... 409/136 |
| 2002/0146297 A1 | * | 10/2002 | Curtis ........................ 409/132 |

* cited by examiner

Primary Examiner—Maria N. Von Buhr
(74) Attorney, Agent, or Firm—Alix, Yale & Ristas, LLP (57) ABSTRACT

A programmable coolant nozzle system includes a coolant fluid nozzle fixed to a manifold so that the centerline of the nozzle and the centerline of the manifold block are perpendicular. This feature allows coolant fluid to be rotatably directed from the nozzle at great pressure and/or volume with an actuator that does not have to withstand severe tortional force. The invention includes a method which allows coolant fluid to be rotatably directed from a nozzle assembly and to be commensurate with any change in position of the working tool of a machine tool center.

9 Claims, 6 Drawing Sheets

PROGRAMMABLE COOLANT NOZZLE SYSTEM

REFERENCE TO RELATED APPLICATIONS

The present application claims benefit of U.S. Patent Application No. 60/290,735 filed May 14, 2001 under 35 U.S.C. §119(e).

BACKGROUND OF THE INVENTION

Automatic CNC machine tools, known as machining centers or as machine tool centers, are used to machine various materials. A rotating cutting tool ordinarily accomplishes the machining. The cutting tool is held in a spindle and rotated. Moving the cutting tool through the material under pre-programmed control allows for precise and complex machining to be accomplished. The machining operation, also may include the use of different tools which the machining center may be programmed to select from a magazine of the machining center, and mount it sequentially in the spindle. The tools used by the machining center may be of various lengths and configurations.

The cutting operation by the machining center may produce excess heat by the action of the cutting tool against the material. This heat adversely influences the cutting tool and/or the material being machined. Application of a stream of fluid coolant to the interface of the tool and the material where the cutting action is occurring must be employed to extend the life of the cutting tool and retain the properties of the material. The coolant fluid may be of a liquid or gaseous form. Current practice involves positioning static or manually adjusted nozzles mounted to the head of the machining center. This practice is problematic due to the fact that tools of various lengths are used throughout the machining process, and a stationary nozzle can only project coolant at one point on the extended centerline of the cutting tool. Operator intervention to manually adjust the nozzle might involve interrupting the operation, slowing the process, and subjecting the operator to a hazardous environment.

One known improvement to manual adjustment of the coolant nozzle is described in U.S. Pat. No. 5,444,634. This patent is directed to a nozzle that is mounted in a housing or the like that can be controlled to move in a manner commensurate with the programmed movement of a particular tool in the spindle. The nozzle is programmed by a "teach" mode that follows step-wise "jog" movements of the tool prior to actual machining of a work piece. The patent does not describe how the nozzle program keeps track of the changing tools, especially in an arm-type automatic tool changer. Furthermore, the nozzle described in this patent is not suitable for handling high-pressure discharge of coolant, nor is it readily adaptable as a back-fit for upgrading existing machining centers.

SUMMARY OF THE INVENTION

The present invention is directed to a remotely controlled coolant nozzle system for mounting to a machine tool center. The nozzle system is mounted to the machine tool such that the coolant stream intersects the tool and work surface interface or a point selected by the operator. The system includes at least one coolant nozzle mounted at right angles to the center axis of a rotating fluid handling manifold block. This allows the nozzle to rotatably direct coolant fluid to the interface of the working tool and the material, as the working tool moves along its perpendicular axis. The manifold block is rotated by electromechanical means (stepping motor or servo actuator) which receives electronic control signals.

The pathway of the coolant fluid is from a coolant fluid source to a coolant fluid input port of a rotating coolant union. The coolant fluid travels through the rotating coolant union to the manifold block. The pathway through the manifold block is coincident with that of the block centerline. The fluid passage through the block extends to a point where it intersects a fluid pathway from the nozzle. The fluid pathway through the nozzle, the nozzle bore, is formed around the centerline axis of the nozzle. Because the nozzle bore is formed around the centerline axis of the nozzle, the nozzle bore intersects the centerline axis of the manifold block around which the fluid pathway is formed, and the manifold block rotates around this center line axis, the torque required for rotating the block, is unaffected by coolant flow or pressure through the fluid pathway and out the nozzle. This allows for the use of a commercially available servo actuator or stepping motor that does not have to withstand high tortional forces and thus achieves high resolution at low cost even when handling great pressures and volumes of cooling fluid. The rotating coolant union allows for the manifold block to be attached to a fixed incoming coolant line and to be rotatable while maintaining a fluid communication with the coolant line. The manifold block rotates around its center axis when acted on by the electromechanical actuator. The actuator and the block may be connected in a variety of ways. A few examples are direct connections, connections utilizing gears, connections using flexible shafts or connections to thrusting and contracting piston assemblies.

The invention also includes a method for controlling a coolant fluid nozzle assembly mounted to the machine tool center. The location of the tool and material interface is determined and signals are sent based on that determination to an electronic control system. The electronic control system processes the sensor signals and then sends control signals to the electromechanical actuator. The electromechanical actuator rotates the manifold block to which the nozzle is connected in response to the control signals. The stream of coolant coming out of the nozzle is thus rotatably directed to the interface in a manner that is commensurate with change in location of the tool along its perpendicular axis.

BRIEF DESCRIPTION OF THE DRAWINGS

The invention will be better understood by reference to the accompanying drawing in which.

DESCRIPTION OF PREFERRED EMBODIMENT

With reference to FIGS. 1–6 wherein like reference numbers refer to like parts throughout the Figures, a remotely controlled coolant fluid nozzle system 1 in accordance with the present invention includes a base plate or other structure 17 fixed in relation to the support on which the head 10 is mounted on the machine tool center, an electromechanical actuator, EMA, 12 mounted on the base plate, a rotatable output shaft 13 from the EMA that can be rotated through an angle of at least about 60 degrees, and preferably 90 degrees, a rotating coolant union, RCU, 16 the RCU having a rotation axis in line with the output shaft of the EMA, a manifold block 14 fixed to and driven by the EMA at one end and rotatably connected to the other end by the RCU, the manifold block having a fluid passage from the rotating input port 18 of the RCU to a nozzle 15, the nozzle being fixed to the manifold block and being perpendicular to the centerline axis of the block. Fluid entering the input port of the RCU passes through the RCU, the manifold block, the nozzle bore and out through the nozzle end. The RCU is preferably a Deublin pn. 1116-607-064 or of a similar design which allows passage of high-pressure fluids from a fixed part to a rotating part with minimal leakage and minimal rotational friction. The EMA is preferably a Futaba S3801 servo actuator or an actuator of similar design, which causes rotation of the manifold block, and thus rotatable movement of the nozzle. The EMA receives control signals from a controller 2 through a nozzle control cable 5. Because the centerline of the nozzle intersects the centerline of the rotating union and the rotational output shaft of the actuator, that the torque required of the actuator is unaffected by coolant flow or pressure through the nozzle. Whereas conventional coolant pressure is in the range of about 30–75 psi, the inventive configuration can accommodate coolant pressure in the range of about 30–1000 psi.

The controller generates control signals for the EMA. In a preferred embodiment the electromechanical actuator is moved as programmed into memory by the operator, and as retrieved via automatic operation. A plurality of programs can be stored, which correspond to different tools used by the machine center. A Microprocessor-based control logic in the control unit 2 is interfaced to the Machine tool center control system 9 via an electrical cable 6 and is connected via an electrical cable 4 to an external operator input device 3 that allows the nozzle angle to be set by the operator for each tool length and for these settings to be retained and recalled with each automatic change of tools.

Figure 1:
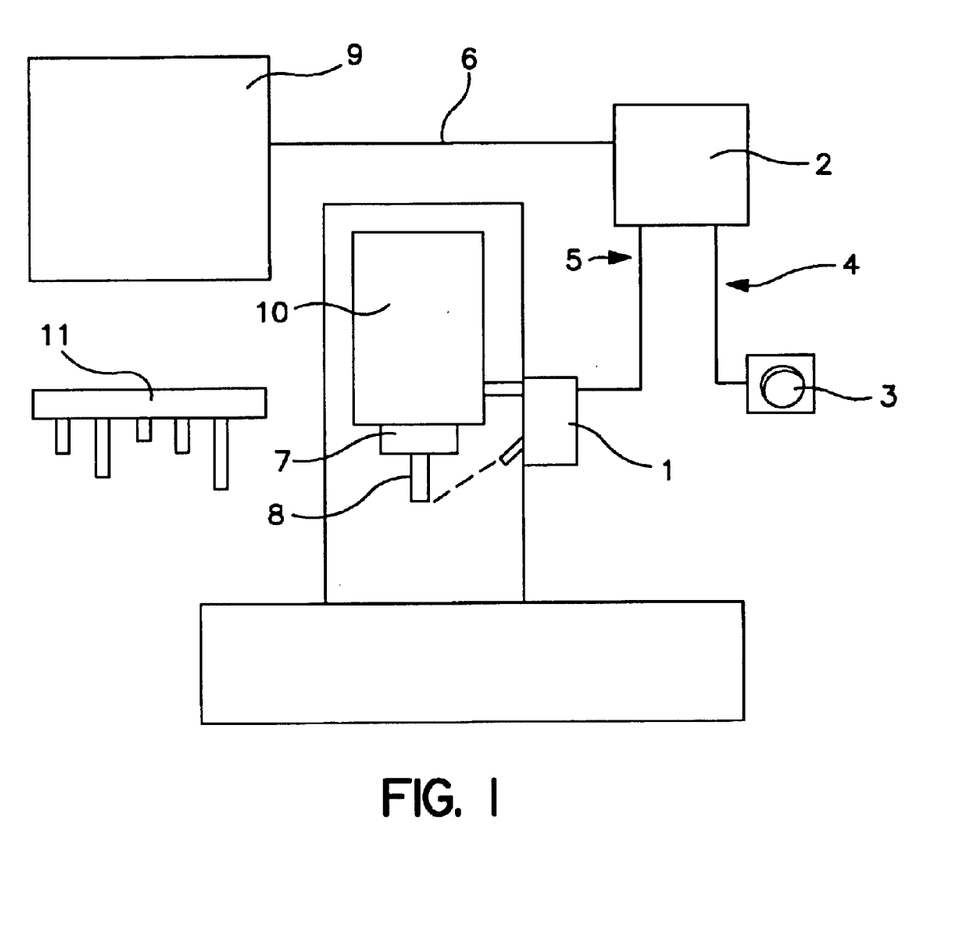
FIG. 1 is front view of a machine tool center.
Figure 2:
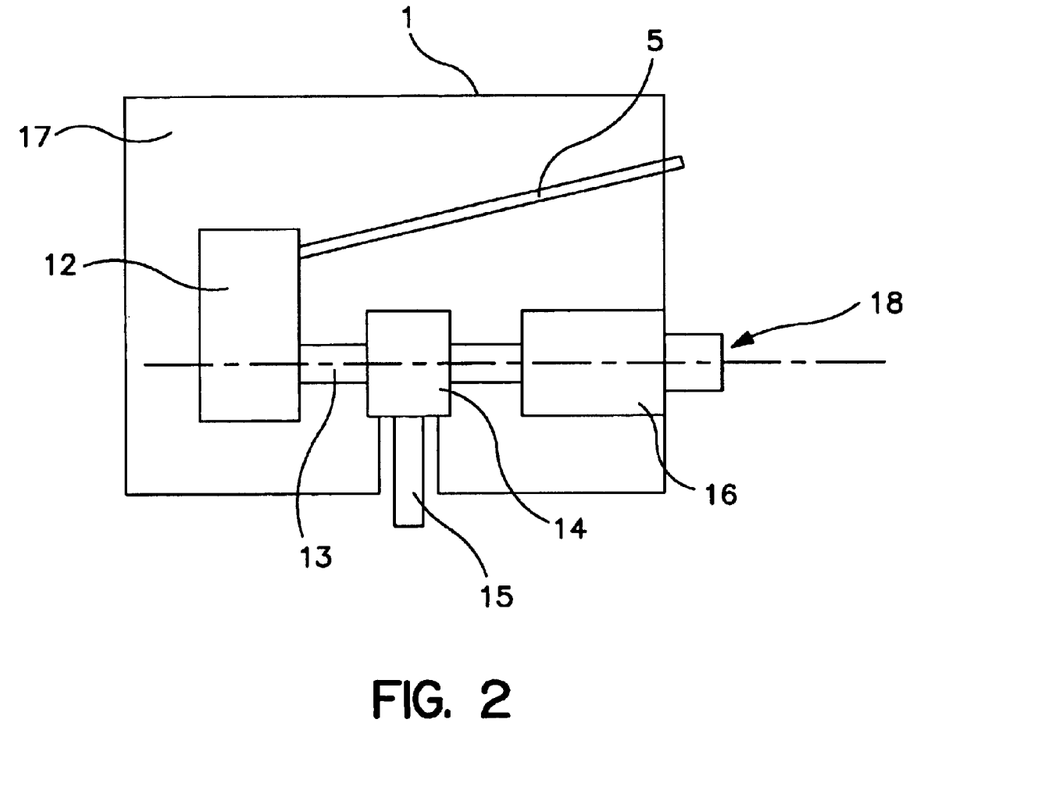
FIG. 2 is a view of the nozzle assembly.
Figure 3:
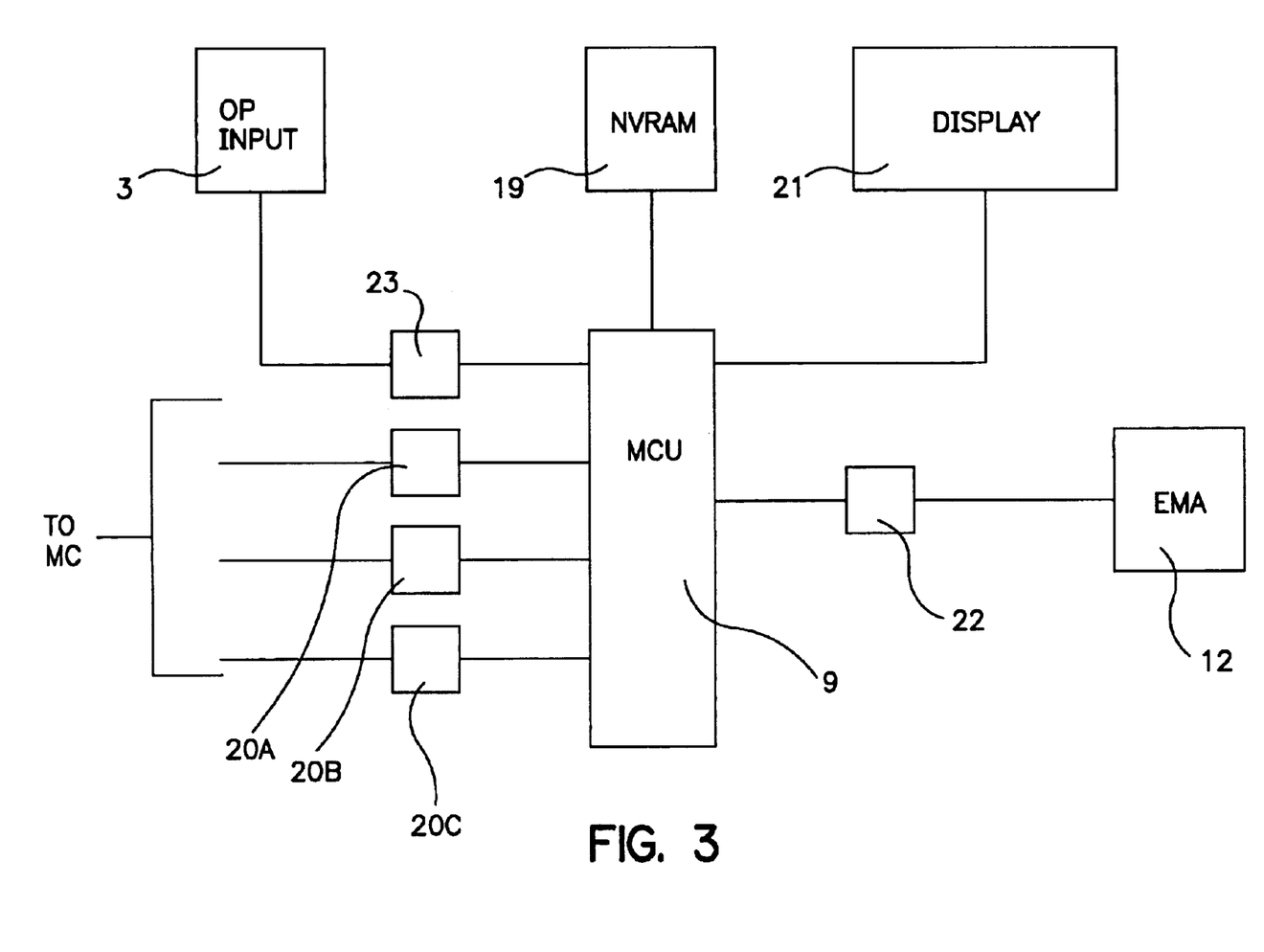
FIG. 3 is a schematic of the electronic control system.

In a preferred embodiment a controller as shown in FIG. 3 has a means of receiving electrical power, a micro controller unit (MCU) 9, a non-volatile random access memory (NVRAM) 19, several optical isolators 20A, 20B, 20C, and 23 a multi-digit display 21, and a signal amplifier 22 for the output to the EMA, an operator input 3 for teaching the system to follow the pre-programmed movement of the machine tools, with the operator input consisting of a detented optical encoder or other device to convert manual rotation to a suitable electrical input, or a momentary switch may be included at the input shaft or next to it for modal control. A preferred method of control is where the electronic control produces an output to the EMA that is dependent on a value stored in a particular address in the NVRAM. This value may be adjusted (increased or decreased) within predetermined limits by rotating the operator input. The MCU interprets the output of the operator input (OI) through a software algorithm and then alters the value stored in the NVRAM. The software then passes the new value to the output for controlling the EMA. This results in the nozzle angle "following" the operator input in real time, acting as visual feedback to aid in programming.

Execution of a tool 8 replacement in the spindle 7 of the machine center can be detected through the use of a plurality of sensors mounted externally to the machine center. These sensors are of a nature and have the placement to allow the sensor to detect when a tool change event has taken place, and to further allow differentiation between tools in machine centers, which have a plurality of tools in the magazine. The sensors to detect mechanical activity such as tool change and movement are well known in the art. Alternatively or in addition to external sensors the execution of a tool change in the machine center can be detected by utilization of sensors existing as per the original equipment manufacturer's design of the machine center. While manufacturers have designed a variety of automatic tool changers (ATCs), certain events and conditions need to be sensed and controlled by all of them. Furthermore, the nature of the available signals is consistent with standard industry practices and available sensing and switching devices. Therefore, it is possible, in most cases, to read and interpret these signals and events in such a way as to derive the number of the tool placed in the spindle as the result of an automatic tool change. This tool number does not have to be consistent with the numbering used by the machine center, but only for the purpose of uniquely and consistently identifying tools for the purpose of aiming the coolant nozzle.

The signals of interest usually consist of a contact closure or a D.C. voltage in the range of 5 to 24 volts. By use of an optical isolator 20A, 20B, 20C, 23 of sufficient impedance and, optionally an available D.C. supply, both types of signals may be read without interfering with the normal operation of the machine center.

The signals required are as follows:

1. Index—this signal indicates the movement of a tool magazine 11 by one tool position past a reference point. This Index signal can be generated by an external sensor 30.
2. Direction—this signal will be asserted or absent depending on the direction of the magazine (forward, backward or clockwise, counterclockwise). This Direction signal can be generated by an external sensor 31.
3. Arm—Certain ATC systems that use an arm 32 or other device to exchange the tool in the spindle with the tool in the magazine. This signal indicates that the exchange has taken place.

The connection points for placement of the external sensors or to determine the points to access the existing machine center signals may usually be discovered by studying the machine center service and technical documents, and using instruments and techniques common to the industry.

Figure 4:
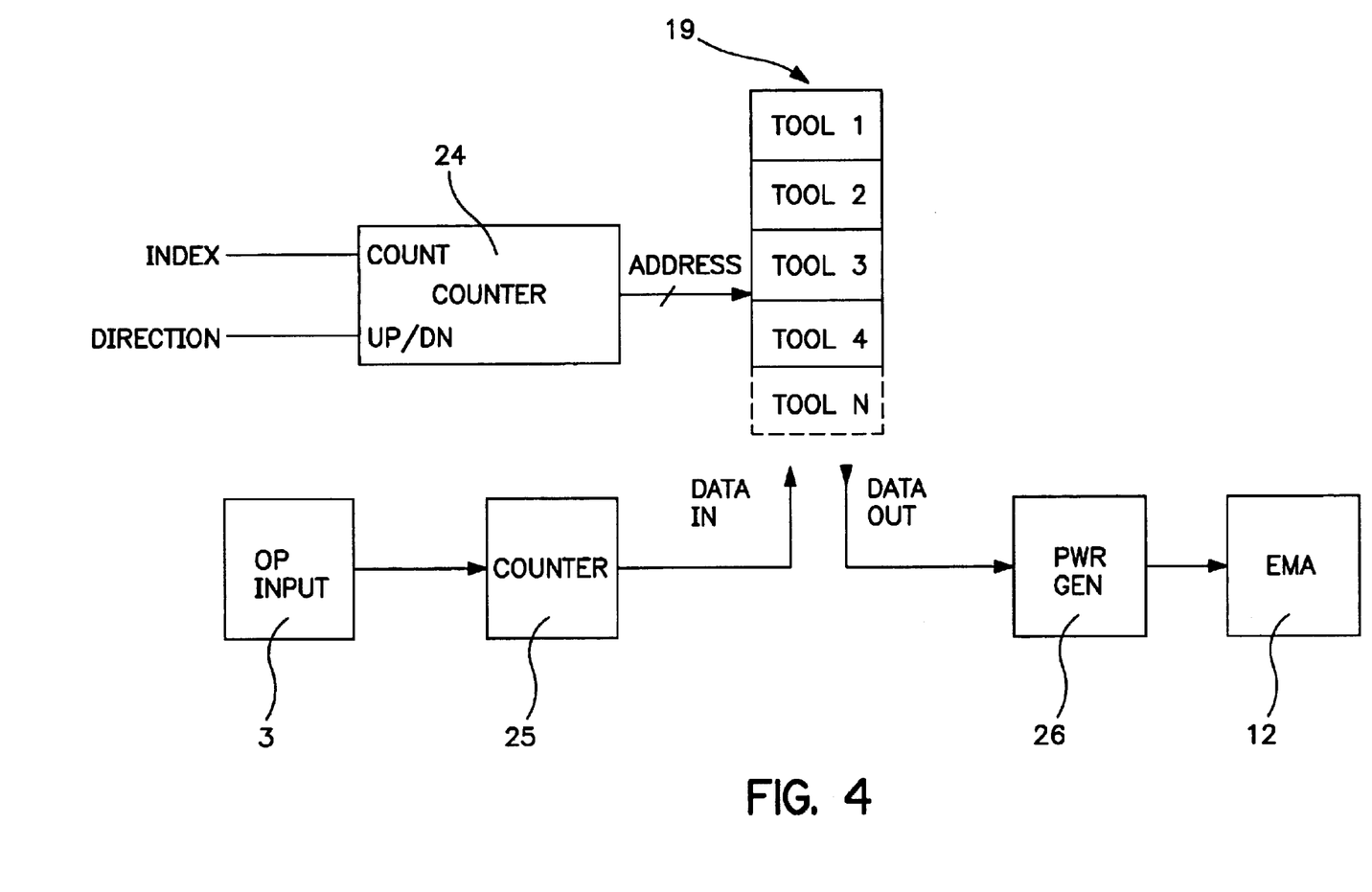
FIG. 4 is a figure of the carousel type software.

A preferred method of control in a carousel-style ATC is shown in FIG. 4. The tool in spindle corresponds directly to the position of the tool magazine. The signals of interest are Index and Direction. These two signals are coupled to an up/down counter of modulo n, where n is the tool capacity of the ATC magazine. Such a counter will count from 1 to n when indexed in the positive direction, then restart at 1. Counting in the negative direction results in n being the count following 1. This counter is implemented in software running on the MCU. The Index signal from the machine center is connected to the count input of the counter 24 and the Direction signal is connected to the up/down input of the counter. In this way, the count or content of the counter will reflect the current tool number of the tool in spindle. Note that no allowance is made for determining a "home" position or absolute reference to the actual tool number. The present preferred system only needs to consistently identify a physical tool position. The content of the counter is maintained in NVRAM so that the current count will be maintained should the machine center lose power.

Figure 5:
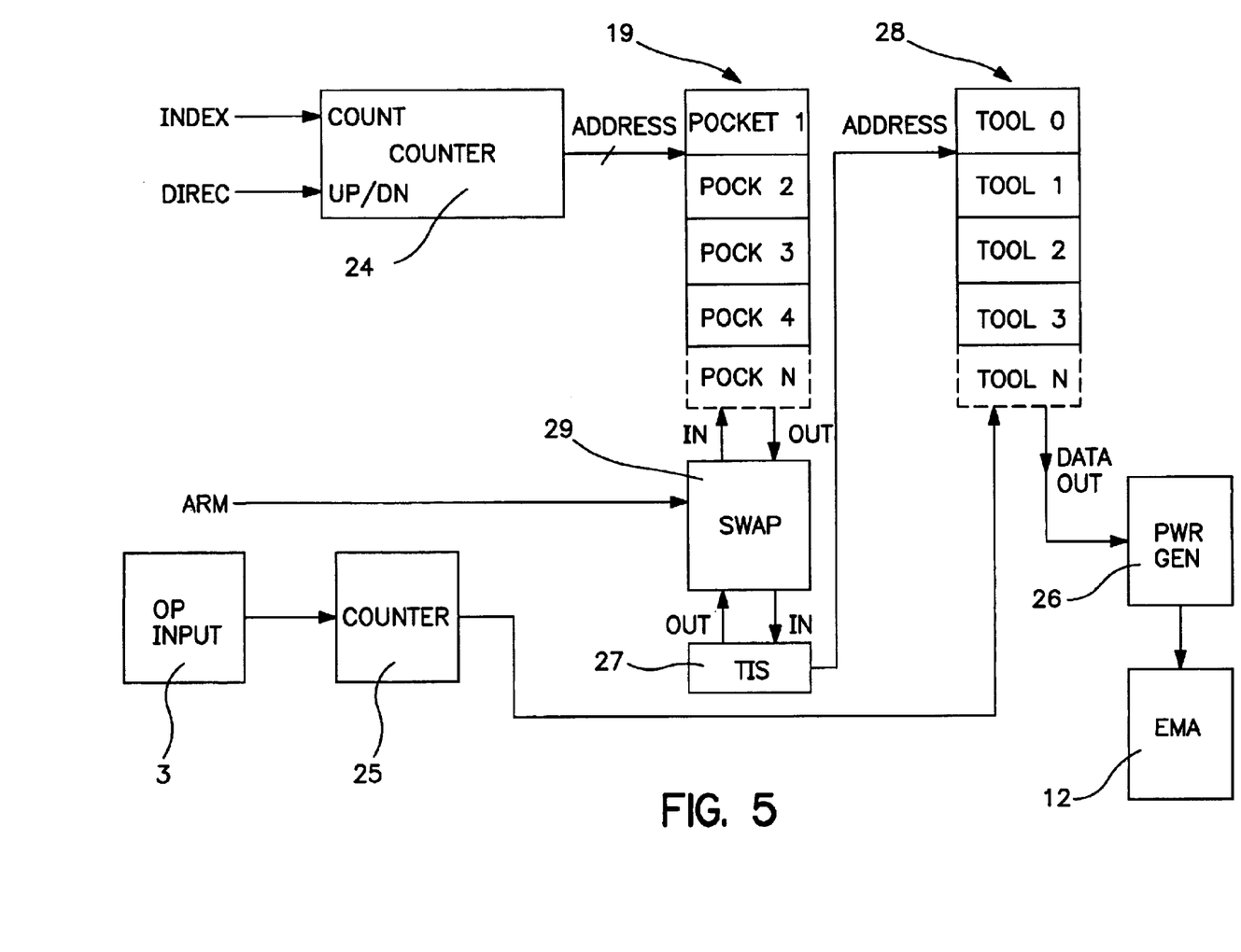
FIG. 5 is a schematic for the arm-type software.
Figure 6:
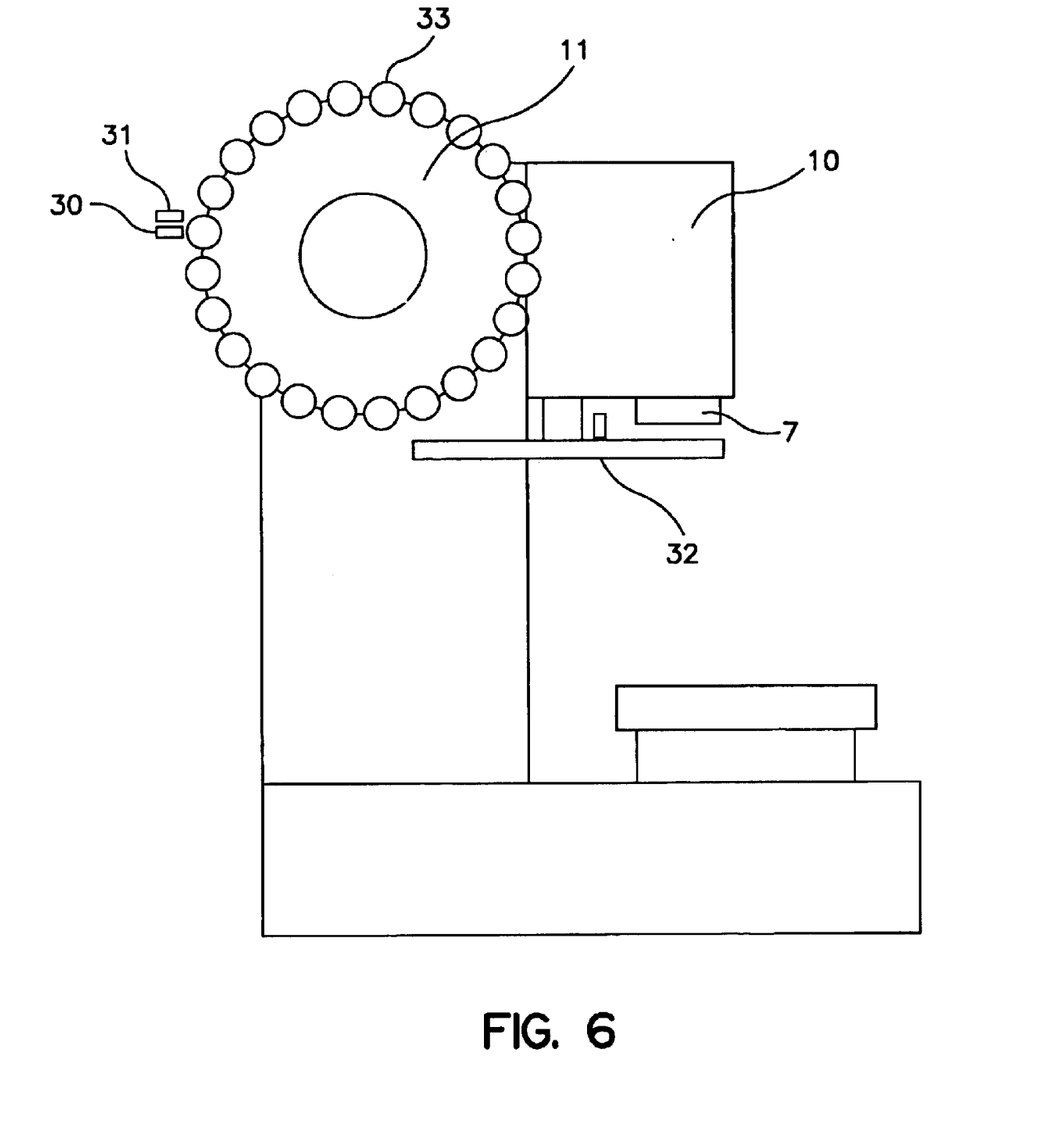
FIG. 6 is a view of a machine tool center with an arm-type automatic tool changer.

The contents of the counter are used as an address pointer to a pre-defined area of the NVRAM, such that when count equals n, the memory location TOOL n is selected. The value contained in this location is then periodically transferred to the EMA output device, in this case a Pulse Width Modulation algorithm generator 26 in software using methods common to the art. From here the signal is transmitted to the EMA, thus effecting positioning of the nozzle. Further, when the Operator input 3 is adjusted, another counter 25 is incremented or deincremented by a proportional amount, and the value of that counter is added to the selected NVRAM location. Upper and lower bounds are set by software to limit the range of this value, and thus the PWM signal and resultant travel of the nozzle. When a tool change occurs, the value of the counter 24 reflects that event, pointing to a different NVRAM address. The operator input and EMA output now act on the new NVRAM address The preferred method of operation of electronic control when used with an arm-style ATC is shown in FIG. 5. This method is similar to that of the carousel style ATC method, and is identical with respect to the handling of the operator input and EMA output. Counter 24 is a modulo n counter where n represents a number of tool pockets 33 in the magazine. The inputs to the counter are interfaced to the ATC in the same manner as with the carousel ATC, so that the output count represents the pocket number available for change. The NVRAM memory area 19 is preloaded consecutively with the numbers 1 through n stored at locations Pocket 1 through Pocket n, respectively. An additional NVRAM location TIS 27 is pre-loaded with the number zero. The value in TIS is used as an address pointer for another NVRAM area 28 which stores the nozzle settings for tools numbered zero through n.

When the magazine advances, the counter 24 selects the appropriate pocket number in 19 but TIS remains unchanged. When the ATC exchanges the tool from the spindle with that in the current magazine position, the signal ARM is asserted, initiating a swap 29 of the value stored in TIS with the value stored in the selected location of NVRAM 19. The new value of TIS is used to select the active memory of NVRAM 28 enabling operator input and EMA output to act on it. In this way, counter 24, NVRAM 19 and TIS location 27 behave as a numerical model of the ATC magazine and spindle, with each stored value having a direct and consistent correlation to the tools in the various magazine pockets and spindle. Further, study will show that the numbers stored initially in NVRAM 19 and TIS location 27 need not be identical to the tool numbers as known by the machine center, nor even that they be consecutive at the start of operation. In fact, the only conditions that must be met for the initial contents of the NVRAM area 19 and 28 are as follows:

1. No two values may be the same
2. Each value must be capable of being used as or resolved to an address in NVRAM 28.

This method provides a system by which each tool in the magazine 11 and the tool in the spindle 7 are associated with a corresponding value stored in NVRAM 28 and the value presented to the EMA will always represent the correct nozzle setting for the tool in the spindle as previously programmed by the operator input.

While a preferred embodiment of the foregoing invention has been set forth for purposes of illustration, the foregoing description should not be deemed a limitation of the invention herein. Accordingly, various modifications, adaptations, and alternatives may be employed by those skilled in the art without departing from the spirit and scope of the present invention.

What is claimed is:

1. A remotely controlled coolant fluid nozzle system for a machine tool center comprising:
   a mount with means for attachment to a machine tool center;
   an electromechanical actuator attached to the mount, and having an output shaft, and means for receiving electronic signals and converting the signals to movement of the shaft;
   a manifold block having a centerline axis and a fluid passage, said block being in mechanical contact with the shaft, the centerline axis and fluid passage being coincident, said block being rotatable around the centerline axis in response to movement of the shaft;
   a coolant fluid nozzle having a centerline axis bore, wherein said nozzle is attached to the block such that the nozzle bore is in fluid communication with and perpendicular to the fluid passage of the block; and
   a rotating coolant union attached to the mount and to the block, said union having a flow path in fluid communication with the block, a means to allow for block rotation around the centerline axis, and a coolant fluid input port in fluid communication with said flow path.

2. A coolant nozzle system in accordance with claim 1, wherein the electromechanical actuator produces a rotational movement of the output shaft through an angle of 90 degrees.

3. A coolant nozzle system in accordance with claim 1, wherein the block has a plurality of nozzles, the centerline of each nozzle being perpendicular to the centerline of the block.

4. In a machine tool center with a working tool and a remotely controlled coolant fluid nozzle system, a method of controlling coolant fluid flow direction by rotating a nozzle commensurate with a changing position of the working tool, comprising the steps of:
   determining a location of an interface between the working tool and a surface upon which the tool performs work, and
   applying a stream of coolant fluid to the interface with the nozzle, and
   rotating the nozzle so as to maintain the application of coolant fluid to the interface as the working tool changes position relative to the work surface.

5. The method of claim 4, wherein the step of determining the interface location comprises,
   sensing the location of the interface indirectly by monitoring relative positions of parts of the machine tool center.

6. The method of claim 5 wherein the step of determining the interface location by sensing the location of the interface indirectly by monitoring relative positions of parts of the machine tool center comprises receiving and processing signals from sensors attached to the machine tool center.

7. The method of claim 6 wherein the step of sensing the location of the interface indirectly by receiving and processing signals from sensors attached to the machine tool center comprises;
   receiving signals from the sensors with a programmable controller, and
   processing signals from sensors with the programmable controller.

8. The method of claim 4, wherein the steps of controlling coolant fluid flow direction by rotating a nozzle commensurate with a changing position of the working tool comprises;
   providing a counter having a memory, a processor, an index and up/down signal inputs, and providing a nozzle setting memory area having a plurality of programmed nozzle settings, and sending an index signal to the index signal input, and sending a direction signal to the up/down input, and processing the index and direction signals, and selecting a nozzle setting from the nozzle setting memory area based on the processed index and direction signals, and generating a control signal based on the programmed nozzle setting sending the control signal to the electromechanical actuator.

9. The method of claim 4, wherein the steps of controlling coolant fluid flow direction by rotating a nozzle commensurate with a changing position of the a working tool comprises;

providing a modulo n counter where n represents the number of tool pockets in a magazine, a first memory area preloaded with a plurality of programmed nozzle settings, a second memory area preloaded with the number 0, a third memory area having a preloaded location with the numbers 1 through n where n is the number of tool pockets in a magazine, and receiving signals with the counter, and processing the signals, and generating a tool pocket signal, and sending the tool pocket signal to the third memory area, and selecting a number from the third memory area based on the tool pocket signal, and replacing the number in the second memory area with the number selected from the third memory, and designating a location in the first memory area with the second memory area selecting a stored programmed nozzle setting from the designated location in the first memory area, and generating a control signal based on the stored programmed nozzle setting sending the control signal to the electromechanical actuator.

* * * * *